United States Patent [19]

Charles

[11] Patent Number: 5,392,663
[45] Date of Patent: Feb. 28, 1995

[54] OCTAHEDRAL MACHINE TOOL FRAME

[75] Inventor: Paul A. S. Charles, Larne, Ireland

[73] Assignee: The Ingersoll Milling Machine Company, Rockford, Ill.

[21] Appl. No.: 150,685

[22] Filed: Nov. 9, 1993

Related U.S. Application Data

[62] Division of Ser. No. 749,582, Aug. 26, 1991, Pat. No. 5,259,710.

[51] Int. Cl.6 ............................................. F16H 27/02
[52] U.S. Cl. ................................ 74/83.15; 74/424.8 R; 74/586; 74/490.03
[58] Field of Search .......... 74/479 BP, 479 BJ, 89.15, 74/424.8 R, 579 R, 580, 581, 586; 414/735; 901/15, 22, 23, 28; 409/235, 201, 216, 238; 408/234

[56] References Cited

U.S. PATENT DOCUMENTS

| | | | |
|---|---|---|---|
| 629,042 | 7/1899 | Moreton . | |
| 3,955,472 | 5/1976 | Frankiw et al. | 90/86 |
| 4,095,655 | 6/1978 | Still | 299/31 X |
| 4,302,138 | 11/1981 | Zarudiansky | 414/5 |
| 4,448,832 | 5/1984 | Kidwell | 428/113 |
| 4,523,882 | 6/1985 | Hengesbach | 408/236 |
| 4,577,621 | 3/1986 | Patel | 128/4 |
| 4,651,589 | 3/1987 | Lambert | 74/479 BP |
| 4,686,800 | 8/1987 | McCormick | 52/81 |
| 4,712,969 | 12/1987 | Kimura | 74/89.15 |
| 4,848,179 | 7/1989 | Ubhayakar | 74/479 BP |
| 4,872,291 | 10/1989 | Lindsey | 51/166 R |
| 4,988,244 | 1/1991 | Sheldon et al. | 409/132 |
| 5,028,180 | 7/1991 | Sheldon et al. | 409/201 |
| 5,129,279 | 7/1992 | Rennex | 74/479 BJ |
| 5,205,613 | 4/1993 | Brown | 299/31 |

FOREIGN PATENT DOCUMENTS

| | | | |
|---|---|---|---|
| 476279A1 | 3/1992 | European Pat. Off. | B23Q 1/02 |
| 1-216238 | 8/1989 | Japan | 128/4 |
| 1222538AL | 4/1986 | Russian Federation . | |
| 1296401A | 3/1987 | Russian Federation . | |
| 1380915A1 | 11/1988 | U.S.S.R. | B23Q 41/00 |
| WO89/09677 | 10/1989 | WIPO | B23Q 1/02 |

OTHER PUBLICATIONS

Proceedings of the Institution of Mechanical Engineers 1965–66, vol. 180, Part I, No. 15, "*A Platform with Six Degrees of Freedom*", D. Stewart, pp. 371–386.

Journal of Mechanisms, Transmissions, and Automation in Design, Jun. 1984, vol. 106 of the Transactions of the ASME, pp. 191–198, "*Feasibility Study Of A Platform Type of Robotic Manipulators From A Kinematic Viewpoint*", by D. C. H. Yang and T. W. Lee.

Excerpt from the London Sunday Times of 3 Jan. 1988, *Polishing Off The Japanese.*

Literature from the National Physical Laboratory (U.K.) in 1987, "*Tetraform 1—A Nanoprecision Machine Tool Concept*".

*Primary Examiner*—Vinh T. Luong
*Attorney, Agent, or Firm*—Fitch, Even, Tabin & Flannery

[57] ABSTRACT

A machine element support comprised of a plurality of axially extensible and contractible servostruts which are individually adjustable and collectively controllable. The struts comprise an outer tubular member and a slidably, interfitted, elongated, inner member. The powered servostruts are movably connected to an machine element such as a spindle head by one of the members on one end and to a rigid machine tool frame by the other of the members on the other end. Linear position sensors mounted on the servostruts serve to precisely measure strut extension and retraction for feedback control purposes. A preferred servostrut configuration is a hexapodal array, in which two servostruts are mounted side by side in each of the three well-known orthogonal axes of machine tool practice, providing six-axis movement and positioning of the tool head or workstation relative to the workpiece.

5 Claims, 5 Drawing Sheets

Fig. 12

OCTAHEDRAL MACHINE TOOL FRAME

This is a division of application Ser. No. 07/749,582, filed Aug. 26, 1991, now U.S. Pat. No. 5,259,710.

This invention relates to machine element supports, and particularly to sensor-controlled servostrut supports for machine tools, utilized within the context of a machine tool frame.

BACKGROUND OF THE INVENTION

Dimensional tolerance and surface finish in machining are widely known to be related directly to the deflection of the cutting tool or the workpiece, or both, steady or vibratory, which in turn is a matter of the rigidity of the system in relation to the magnitude of the loads imposed thereon by the cutting action, whether the operation be drilling, milling, boring, turning, grinding, broaching, or combinations thereof, e.g., so-called "turn broaching". The time-honored shop practice of taking a rough cut to remove material and a finish cut, one or more, for size and surface finish is in part a reflection of the lack of rigidity of the machining system overall, "system" in this sense meaning not merely the cutting tool and the frame of the machine that wields the tool and supports the work, but also the workpiece itself.

The workpiece is necessarily a variable in a general machining situation, although less so in repetitive production machining operations, such, for example, as transfer lines and similarly automated production machining operations.

In either case, the approach heretofore generally taken to the realization of greater rigidity in the machine tool per se, whether for the sake of applying greater cutting forces, or achieving tighter machining tolerances or better finishes, has been toward more massive framing in the traditional format, whether of the freestanding column sort identified with so-called "machining centers" having horizontal spindles, the C-frames of smaller vertical spindle machines, or the column-spanning beams of so-called portal and gantry machines.

A noteworthy departure appeared in 1987 with the public announcement in Great Britain of a machine having a tetrahedral frame fitted out as a grinder said to be able to maintain nanometric tolerances. Photographs published in the London Times of 3 Jan. 1988, as well as in 1987 literature of the National Physical Laboratory, show a tetrahedral frame of six stout struts each connected at its ends to a large ball at each of the four nodes of the frame, and each having a mid-length load-receiving connection to the work support or to the tool-spindle support. As the published prototype was constructed on a relatively small dimensional scale, the tubular struts incorporated vibration-damping and were tuned to a natural frequency well above the level of the forcing frequencies to be anticipated.

The tetrahedral frame is the subject of U.S. Pat. No. 4,872,291 of Oct. 10, 1989.

The practical limitations of the tetrahedral frame, due in large part to its lack of orthogonal symmetry about the tool-workpiece interface, to its poor efficiency of plant space utilization for the limited usable space within its confines, and to its lack of adequate facility for transferring forces from tool and work supports to the frame without flexural stress in the frame, have led to the present invention.

SUMMARY OF THE INVENTION

This invention combines the rigidity of a machine tool frame with the precision of sensor-controlled servostruts to provide improved support for machine tool operations.

The powered servostruts described herein are axially extensible and contractible, and equipped with linear position sensors able to precisely measure the strut extension and retraction for feedback control purposes. The axial movement of each servostrut is accomplished using a power driven linear actuator. A machine element such as a spindle head or movable workstation is supported by a plurality of these servostruts, with the base ends of the servostruts mounted movably in a machine tool frame.

In the preferred configuration, the tool head or workstation is movably supported hexapodally by six of the servostruts, of which two are mounted side by side in each of the three familiar orthogonal axes of machine tool practice, providing six-axis movement and positioning of the tool head relative to the workpiece. The preferred machine tool frame is in the form of a regular octahedron, with three of the six nodal connections serving as the mounting sites for the base ends of the servostruts. The triangular panels of the octahedral frame create an inherently stable structure to compliment the enhanced positional precision provided by the sensor-controlled servostruts.

DESCRIPTION OF THE DRAWINGS

The invention is described in reference to the accompanying drawings, in which.

DESCRIPTION OF THE PREFERRED EMBODIMENT

Figure 2:
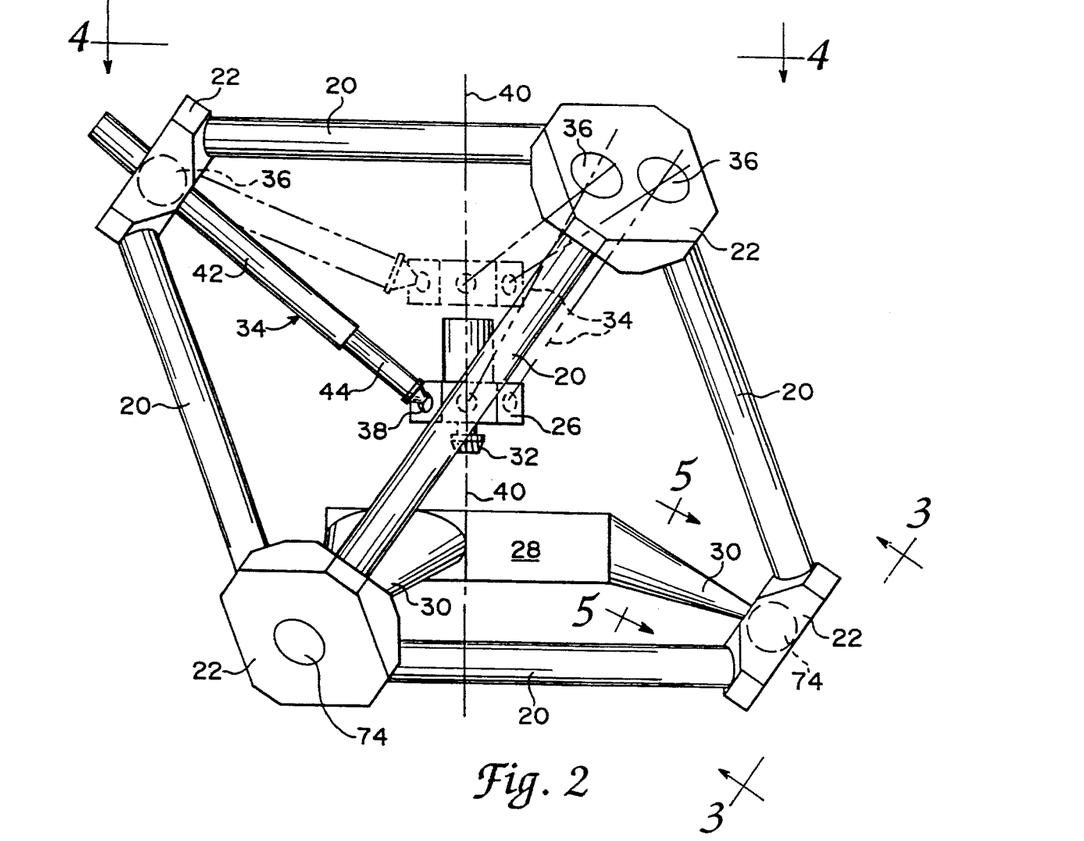
FIG. 2 is a elevational view of the octahedral machine frame of the invention, seen in projection to a plane perpendicular to one of the planes of symmetry of the octahedron, having therein a hexapodally mounted spindle head with six degrees of freedom of motion above a fixed workpiece support.
Figure 3:
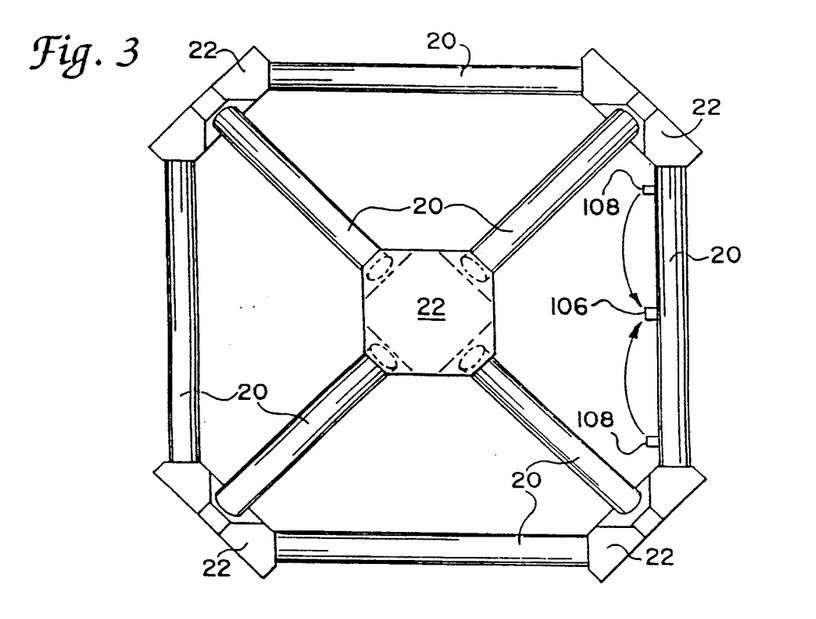
FIG. 3 is a view of the frame of FIG. 2 projected to the plane projecting as the line 3—3 of FIG. 2 with the operative elements of the machine tool omitted for clearer illustration of the octahedral frame.

As illustrated in FIGS. 2 and 3, the machine frame of the invention comprises an array of twelve stiff struts 20 of equal length joined together in the form of a regular octahedron by six modal connecting members 22. The struts 20 may be solid cylinders but are preferably fabricated of thick-walled tubing, for purposes which will later appear, and are rigidly connected to their respective nodal connecting members 22 by welding, or by screws, bolts, or tie rods. The nodal connecting members 22 are designed as thick blocks which truncate the octahedron slightly at its apices to facilitate the mounting of the active machine tool elements. As illustrated, they are provided with facetal surfaces perpendicular to the axes of the frame struts 20 but could take a variety of shapes, the principal functional requirement upon the connecting members of the frame being that they be sufficiently rigid to minimize the conversion of the loads applied to them by the active machine elements into bending moments exerted on the ends of the connected struts.

The kind of machine tool chosen for illustration in FIG. 2 has a movable milling, drilling, or boring spindle head 26, the spindle axis of which, for convenience of description, may be thought of as oriented vertically on the mutual perpendicular to the centroids of the triangular top and bottom panels of the octahedral frame, poised above a fixed worktable 28 supported by three legs 30 radiating from the worktable to the connecting members 22 at the nodes of the lower triangular panel of the frame.

As shown in FIG. 2, the spindle is fitted with a face milling cutter 32, which could, of course, be replaced with a milling cutter of any kind, or a boring tool, or a drill, or an electronic inspection probe. Equally, the spindle unit itself might be that of a grinder, or could be replaced by a composite tape or tow laying head, or by any electric, electronic, gas, laser, or fluid work unit requiring complex spatial paths.

Figure 4:
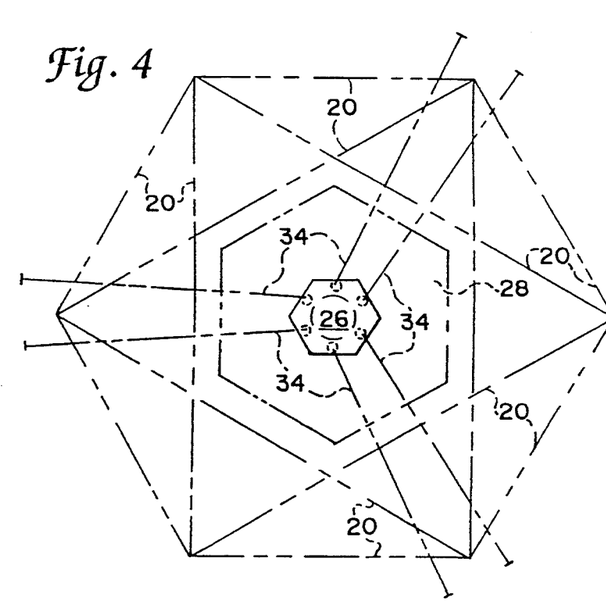
FIG. 4 is a diagrammatic representation of the machine frame of FIG. 2 as projected to the plane represented by the line 4—4 of FIG. 2, i.e., a diagrammatic top view of the frame and work support shown in FIG. 2.

In accordance with a further aspect of the invention, the spindle head 26 is movably supported hexapodally by six individually adjustable and collectively controllable extensible and retractable servostruts 34, of which two are mounted in a first universal joint such as a ball joint at each servostrut's base end in each of the frame's three upper nodal blocks 22, giving the distal end of each strut a spherical sweep within a limited range. A second universal joint at the distal ends of the struts 34 connects each of the struts to the spindle head 26 in hexagonal array about the sides of the spindle head. The spindle head may itself therefore conveniently be hexagonal in plan, as shown in FIG. 4, or may be cylindrical, or may take any other reasonable shape, to receive the ball ends of the six supporting struts respectively in individual ball sockets hexagonally arrayed in the side surface or surfaces thereof.

As is well-known, the six extensible and retractable struts 34, acting coordinately under appropriate common control, provide six-axis movement and universal positioning of the spindle head relative to the workpiece, within the limits of movement of the individual servostruts, i.e., linear movement along, and rotation about, the three familiar orthogonal axes of machine tool practice, only one of those movements, namely, linear movement on the vertical or Z-axis 40 of the machine, being illustrated in FIG. 2.

The specified hexagonal array of the distal-end universal joints 38 is preferred to the essentially triangular array employed in some hexapodally supported platforms of the prior art because of the greater stability it lends to the platform in all attitudes, and because of its much reduced susceptibility to assume positions from which no recovery is possible. The latter condition is a shortcoming of the triangular array. Specifically, if any two of the six legs which are paired at one of the triangularly arrayed connections of the legs to the platform are permitted to assume a position coplanar therewith, no manipulation of any of the legs can produce a restorative moment to assure that the toggle thus formed will pivot from center in the restoring, i.e., returning, direction.

With the hexagonal array, in contrast, a restorative moment is always exertable on the controlled body to permit a consequently greater degree of controlled, stable positioning. The hexagonally arrayed form would, equally with the triangular, be unstable in the exceptional case in which all six legs were coplanar, but such an attitude is readily avoided with appropriate limits either of servostrut construction or programmed movement. Indeed, it is quite possible, in the hexagonally arrayed form, to move the platform through the common plane of the base joints of the servostruts, if that should be desired, say, for additional clearance space within the octahedral frame for loading and unloading workpieces, by programming the movement to pass the platform through that plane only and always in a tilted condition, i.e., so that the plane of the hexagonally arrayed joints 38 never coincides with the common plane of the base joints of the servostruts.

The servostruts 34 are mounted side by side in the three nodal blocks 22 of the upper panel of the frame as seen in FIG. 2, from which they extend downwardly in pairs to the spindle head 26, which, like the nodal blocks of the frame, is constructed so as to be extremely resistant to bending, and, like the machine frame itself, is positioned extremely rigidly in any attitude or position by the triangular arrays of the six servostruts 34.

Figure 6:
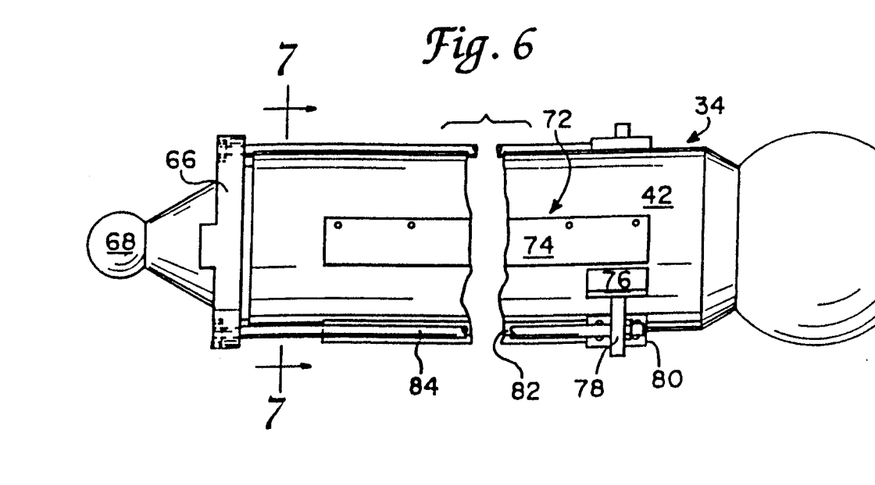
FIG. 6 is a foreshortened elevational view of a servostrut employed in the machine of FIG. 2.
Figure 7:
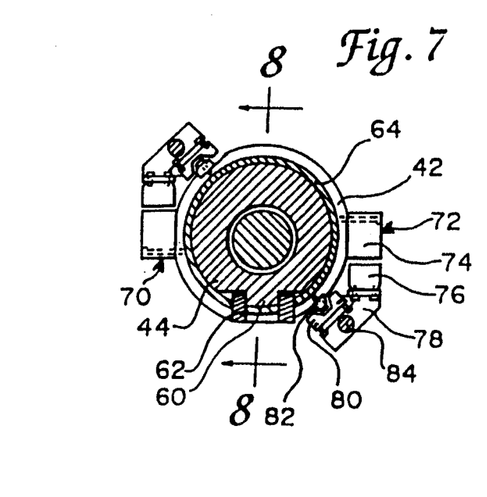
FIG. 7 is a sectional view of the servostrut, taken on the line 7—7 of FIG. 6.
Figure 8:
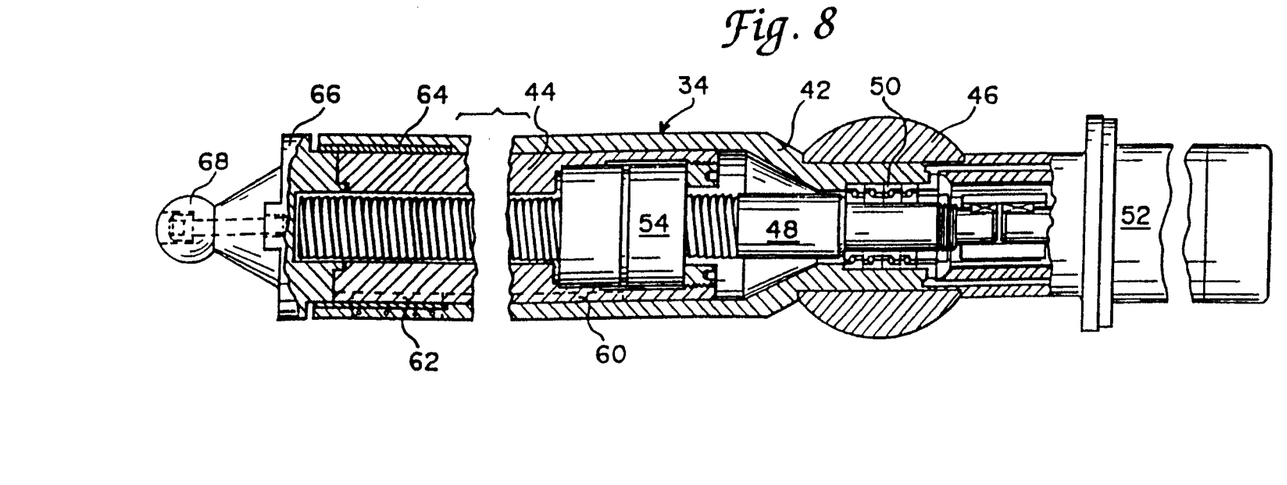
FIG. 8 is a cross-sectional view of the foreshortened servostrut of FIGS. 6 and 7.

The servostruts themselves, as shown in FIGS. 6, 7 and 8, are essentially two telescopically and nonrotationally interfitted thick-walled tubes 42 and 44, the outer of which, 42, is the base member set concentrically within a ball 46 on which it is swingable with an included angle of the order of 60 degrees when mounted in the mating spherical socket of the ball joint 36 in the upper apical blocks of the machine frame. An axial screw 48 journaled in multiple thrust bearings 50 for rotation in the outer tube is driven by a servomotor 52 coupled to the screw at the right-hand end thereof as seen in FIG. 8. The screw 48 is engaged by a nut 54 keyed and secured within the inner, extensible one, 44, of the two telescoped tubes which constitute the strut.

The thrust bearings 50 which support the power screw are heavy duty bearings which are designedly centered within the ball 46 to transfer load from the screw to the ball, and thus to the machine frame, with a minimum of deflection, and the screw itself and its mating nut are preferably of the planetary roller type.

Although the motive power of the servostruts 34, as presently contemplated, is provided by a motor driven screw-and-nut assembly, other forms of electromechanical drive, or a hydraulic cylinder drive, amenable to control with comparable accuracy, may be employed.

The inner tube 44 is secured against rotation within the outer tube 42 by the arrangement shown best in FIG. 7. A keel 60, defined between two flats milled in the outer surface of the inner tube 44, is engaged on both sides by a pair of stout guide bars 62 of bronze, which extend into the interior of the outer tube 42, through the slide bushing 64 at the mouth of the outer tube, being secured to the outer tube by machine screws seated in tapped, near tangential holes in the wall of the outer tube between the guide bars.

A cap 66 secured to the outer end of the extensible and retractable inner tube 44 carries the smaller ball 68 received in the appropriate ball socket 38 of the spindle unit 26. The actual extension of the inner tube from the outer tube, over a range which may be of the order of 30 inches, for example, is accurately measured for feedback control purposes by diametrically opposed linear position sensors 70 and 72 for position feedback to the power amplifier for the power source of each strut. Each of these linear position encoders 70, 72 employs cooperating fixed and movable members, the preferred embodiment comprised of a fixed member such as a scale 74 secured to the outer surface of the outer tube 42 along a flat milled thereon to provide a stable seat, and a moveable member such as a reader 76 mounted on a bracket 78 which is mounted in turn upon a carriage 80 movable axially of the strut upon a linear bearing 82 likewise seated on a flat milled in the outer surface of the outer tube 42. A rod 84 anchored at one end in the end cap 66 and adjustably at its other end in the bracket 78, moves the reader 76 along the scale 74 to provide a digital indication of the degree of extension of the inner tube from the outer. Duplicate opposed sensors are employed to render readings which are then averaged to compensate for any bending of the strut due to transverse gravitational and inertial forces. Velocity feedback is provided by a conventional tachometer built into the servomotor, and not separately shown. It will be understood that the complication of six-axis movement is preferably directed with presently available machine tool control systems by computer numerical control.

While the double linear measurement of servostrut extension at the site of movement is preferred for accuracy, it is recognized that the use of a single linear sensor to record extension may be acceptable where the degree of accuracy required by the application is less stringent. Where accuracy to a critical degree is not required, a rotary encoder at the motor may suffice but is not preferred because it cannot detect the compliance of the strut under axial load.

Figure 5:
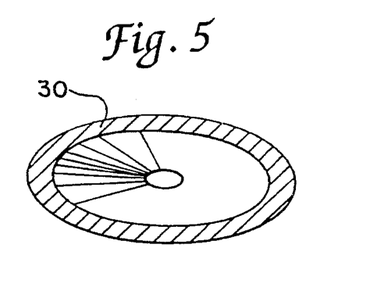
FIG. 5 is a sectional view of one member of the machine of FIG. 2 taken along the line 5—5 thereof.
Figure 9:
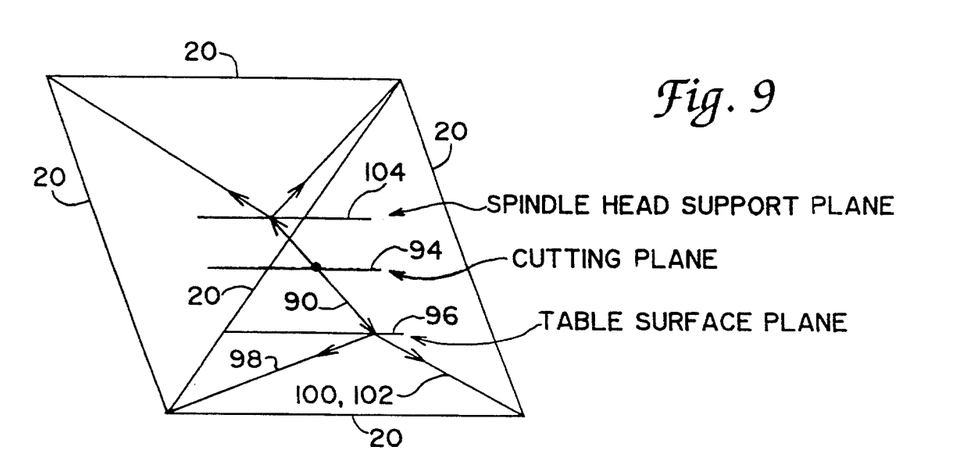
FIG. 9 is a diagram illustrating the instantaneous vector of the cutting force and its reaction in the machine setup of FIG. 2 and its resolution at the planes of the spindle support platform and worktable into components directed, respectively, toward the upper and lower nodes of the octahedral frame.
Figure 10:
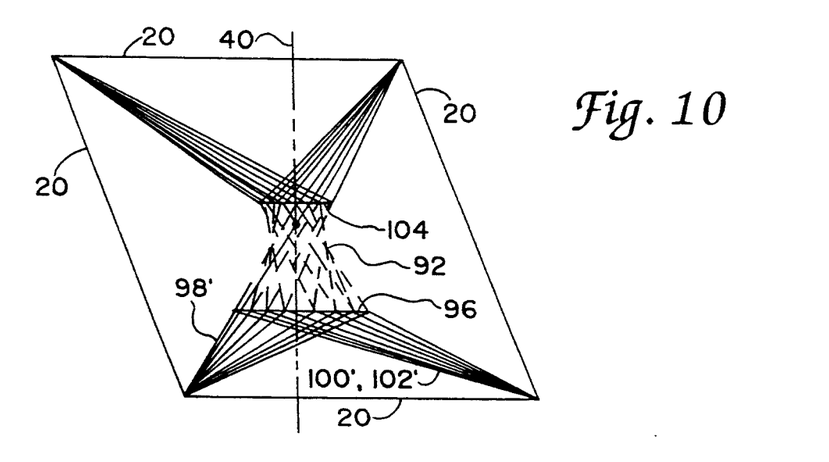
FIG. 10 is a view similar to FIG. 8 illustrating the hyperboloidal locus of the cutting force vector and the elliptically conical loci of the resolved components thereof directed toward the nodes of the octahedral frame, illustrating how the configuration of the suspension and support members of a fixed spindle unit and/or worktable may be derived for maximum resistance to flexure.
Figure 11:
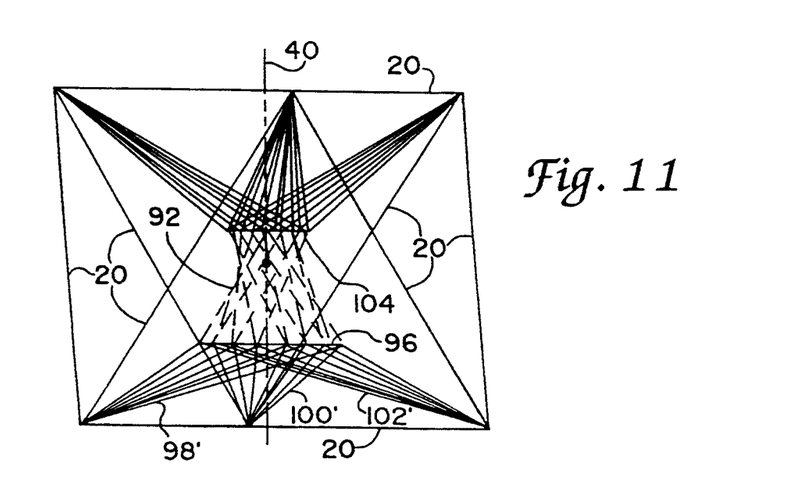
FIG. 11 is a view similar to FIG. 9 with the octahedral frame rotated about a line through the centroids of the upper and lower triangular faces thereof, better to illustrate the resolution of the cutting force vector components to their respective nodes of the frame.

As earlier noted, the three supporting legs 30 of the fixed worktable 28 are preferably shaped as elliptical cones which are sized and configured by the procedure outlined in the diagrams of FIGS. 9 to 11, inclusive, so as to contain within the material constituting each individual leg of the worktable the resolved component of the cutting force reaction associated with its respective leg. The manner in which that configuration is derived, i.e., the elliptically conical configuration indicated by FIGS. 2 and 5, will be appreciated by giving attention first to FIG. 9.

In any rotary cutting tool, the cutting force and its reaction 90 are directed along a line which passes through the active cutting edge of the tool at a distance from the axis of rotation of the tool and is inclined with respect to a plane perpendicular to the rotational axis at an angle dependent upon cutting speed, feed, depth of cut, cutting edge geometry, workpiece material, etc. As the tool rotates, so also does the force vector 90, which therefore describes a hyperboloid of revolution 92 about the spindle axis 40 (FIG. 10). As the cutting force generated in the workpiece at the cutting plane 94 is transmitted to the worktable 28 at its surface, the cutting force 90 is resolvable at the plane 96 of that surface into three component force vectors 98, 100, and 102, each instantaneously directed to its associated node of the lower panel of the octahedral frame. The traces of the three separate component vectors from the circular intercept of the rotating cutting force vector with the surface 96 to the three lower nodes of the octahedral frame take the form of three elliptical cones 98', 100', and 102' (FIGS. 10 and 11).

Inasmuch as it is desirable that these component forces be directed through the material of the support legs to avoid subjecting that member to bending stresses, it becomes desirable to form the three support legs 30 in an elliptically conical configuration in order to sustain those forces with an absence of, or at least a minimum of, flexural stress. Moreover, inasmuch as the inclination of the cutting force vector will vary with variation of its determining factors earlier mentioned, the elliptically conical support legs 30 are desirably formed and dimensioned as the inclusive envelope of all reaction force components 98', 100', and 102' for all sizes of circular intercept of all anticipated hyperboloids of revolution at the surface of the worktable. Such all-inclusive support legs may well be larger and thicker of wall, and therefore necessarily stiffer, than if designed for a single specific application.

The outer ends of the support legs 30 of the worktable 28 may be firmly secured in the lower nodal blocks of FIG. 2 in any convenient way but have been shown as secured to a ball 74 received in a mating socket in the nodal block, as a precaution against transmission of bending moments from the worktable 28 to the machine frame.

Figure 12:
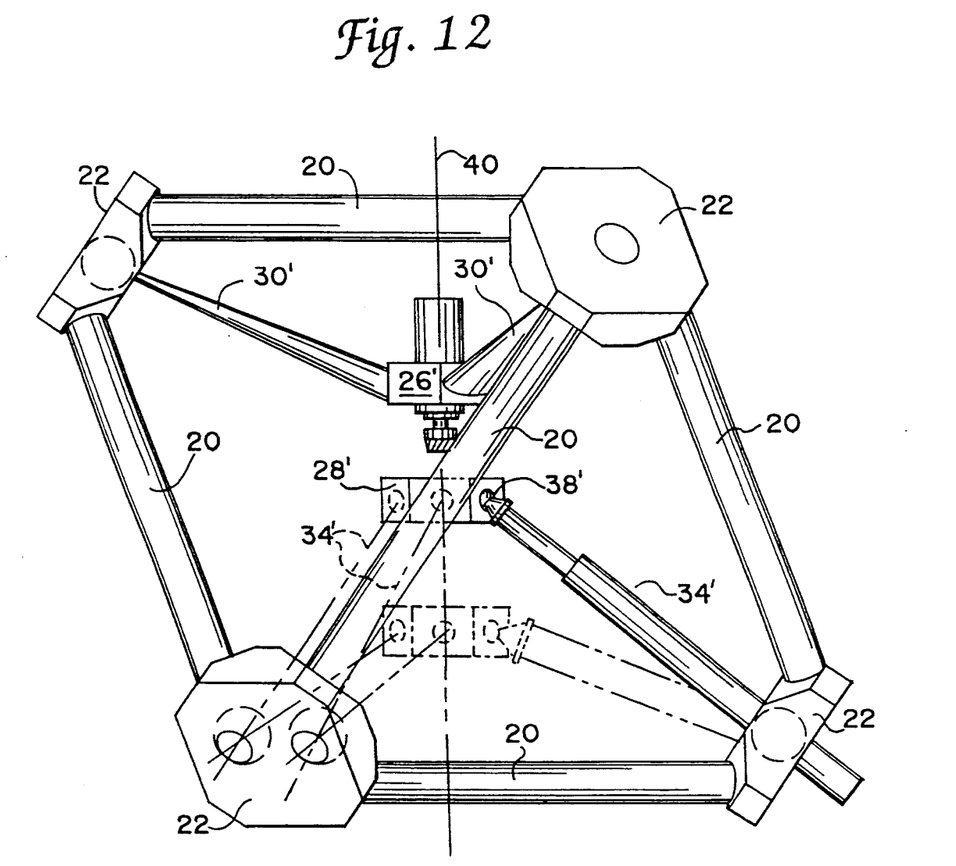
FIG. 12 is an elevational view of the octahedral machine frame, similar to FIG. 2, but with the nature of the respective supports of spindle unit and worktable reversed.

The reverse arrangement of spindle head and worktable is shown in FIG. 12, wherein the spindle head 26' is fixedly supported within the octahedral frame by three arms 30', and the worktable 28' is movably mounted on the six servostruts 34'. The design of the support arms 30' preferably follows the criteria outlined for the design of the support legs 30 of the fixed worktable 28 of FIG. 2, i.e., following the force resolution diagrams of FIGS. 9 to 11, inclusive, to result in elliptically conical support arms 30' for the spindle unit 26'. As the cutting force reaction generated in the tool at the cutting plane 94 is transmitted to the spindle unit in large part at its lower surface, the ultimate configuration of each support arm is derived from the circular intercepts of all anticipated cutting force reaction vectors with the plane 104 of the lower surface of the fixed spindle unit 26'.

Figure 1:
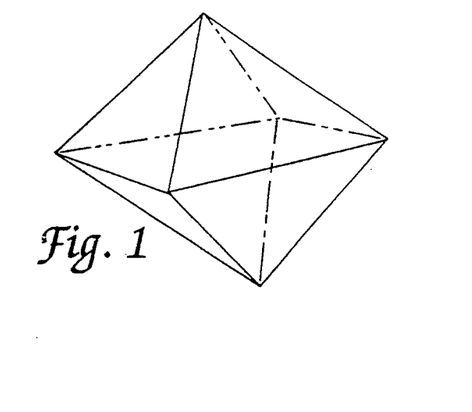
FIG. 1 is a perspective diagram of a regular octahedron, included for orientation.

In the illustration of the principle of octahedral machine tool framing by reference to merely two particular kinds of machine tool, the active parts of which are disposed within the octahedral frame, it was convenient to view the frame as though positioned upon one of its triangular facets as a horizontal base panel, however supported. The permissible orientation of the octahedral frame, however, is essentially unlimited because of its uniform stiffness with respect to any set of orthogonal axes. Instead of positioning the frame as shown in FIGS. 2 and 12, i.e., with the mutual perpendicular to the centroids of opposed panels coinciding with the gravity vector, the frame could be positioned as indicated by FIG. 1, viz., with the gravity vector aligned with any interior diagonal, or, indeed, with the frame positioned in any other orientation suited to the builder's purpose.

Similarly, while the operative parts of the machine tool are illustrated with a single spindle, with either the spindle or the worktable nominally horizontal but movable with six degrees of freedom, multiple spindle units may be employed, hexapodally supported from the "side" panels of a frame oriented as shown in FIG. 2, to address from several sides a workpiece on a worktable centrally disposed in any orientation within the frame. Indeed, there appears to be little reason in principle why such a hexapodally mounted work unit, whether spindle unit or otherwise, should not be mounted on the exterior of an octahedral frame. The possibilities of taking advantage of the inherent stiffness of the octahedral frame in machine tool construction, while not limitless, nevertheless afford the machine tool designer broad options for machine configuration.

In the foregoing Summary of the Invention, reference was made to the uniform stiffness of the octahedral frame with respect to forces directed through its centroid. That ideal situation will not obtain, except perhaps in drilling, but the variation from uniformity of stiffness with respect to actual cutting forces not centroidally oriented is relatively slight due to the fact that the stiffness of the frame overall, in any direction, is the sum of the stiffness of its members resisting the applied load.

The same observation is apt to the hexapodal servostrut support of the machine elements, whether worktable or spindle unit. If the machine element be centered, i.e., with all struts at uniform length, its stiffness on all coordinate axes will be identical, and assuming equal stiffness in the support of the mating machine element, a perfect cylinder could theoretically be bored because the radial stiffness would be constant.

Away from center, i.e., with the servostruts adjusted to nonuniform length, the loss of uniformity is slight because although strut stiffness varies inversely with length, the total stiffness of the hexapodal mount in any direction is the summation of the stiffnesses of the individual struts, some of which will typically be shortened as others are lengthened in the wielding of the machine element.

The foregoing discussion of octahedral machine tool framing has proceeded on the basis of the regular octahedral form, i.e., with all struts of uniform length and construction. While such is preferable for symmetrical stiffness on and about all orthogonal axes, there may be instances where symmetry of stiffness can be sacrificed to advantages possibly to be gained from purposeful deviation from symmetry of form, and the octahedron varied from the regular to an irregular format. In any such case, however, the principles of avoidance of flexural stress in the individual constituent members of the assembly, and in the transference of load between them, will nevertheless desirably be observed.

The self-compensating nature of a regular octahedral frame with changes of ambient temperature assumes a uniform ambience, which may not always be the case. To that end, the invention contemplates a refinement that makes desirable the use of thick-walled tubing for the frame struts 20. Apart from the desirable economic and uniform distribution of material about the neutral axis of the tubular form, the hollow interior makes possible provision for the circulation through the frame struts of a temperature-controlling fluid from a heat exchanger (not shown) to equalize the temperature of all struts and thus to avoid the creation of bending stresses therein due to unequal expansion or contraction. For that purpose, as indicated with respect to one strut in FIG. 3, an ingress port 106 may be provided at mid-length of each strut, with egress ports 108 at opposite ends. The fluid used is preferably such so as to serve a vibration-damping function as well.

It will be observed that no foundations, such as typically are used in large-frame machine tools to close the kinematic loop, are shown in the drawings. That is because the kinematic loop is closed within the octahedral frame itself which, in the FIG. 2 and 12 orientation, may simply rest upon the machine floor, in which some suitable provision may be made to receive the lower connecting members 22 in vibration-proof mountings to isolate the frame from exterior forces and to immobilize the frame.

In different orientations of the frame in which it would not otherwise be stable with respect to gravitational or other external forces anticipated, it may be necessary to support the frame with a pier or pedestal at one or more of its frame nodes, i.e., connecting members 22, to stabilize the frame.

While foundations as such are not essential, nor in fact beneficial from the standpoint of the different behavioral characteristics of the dissimilar material employed, e.g., concrete, it is conceivable that for some purposes a concrete or other monolithic foundation suitably stiff, might be employed in whole or partial substitution for one or more of the lower panels of the octahedron, however oriented. In such circumstances, it would however be necessary to accept the effects of bending stresses resulting from differential response to temperature changes and the differential compliance of the kinematic loop or loops to the work loads encountered.

The features of the invention believed new and patentable are set forth in the appended claims.

What is claimed is:

1. An axially extensible and contractible servostrut comprising:
   an elongated, outer, tubular member and a slidably interfitted, elongated, inner member;
   a first universal joint on one of said members for mounting said servostrut for swinging movement in any direction about said joint, and defining the base end of the strut;
   a second universal joint on the other of said members at the distal end of the strut for connecting the same to a body for pivoting movement on any axis relative thereto;
   a power driven linear actuator in one of said members engaged with the other end to extend and contract the strut; and a linear position sensor on one of said members directly responsive to the axial movement of said members relative to one another for generating a feedback signal to a power source representative of the degree of extension of the strut.

2. The servostrut of claim 1 wherein a second linear sensor is mounted on said one of said members on a side thereof opposite said linear position sensor; these linear position sensors are mounted on opposite sides of said servostrut so as to generate differentiable signals which are then averaged for a true measure of strut extension in the event the strut should bend.

3. The servostrut of claim 1 wherein the inner member is also tubular, the power driven linear actuator is a screw journaled in said outer member engaged with a nut in the inner member and said members are non-rotationally interfitted, said first universal joint is a ball joint having a ball, the screw is driven by an electric servomotor mounted on said outer member, said servomotor extends from said ball joint in the direction opposite the distal end of the strut, and the screw is journaled in thrust bearings within the ball of said ball joint, and the position sensor is a linear scale mounted axially of said outer member and a scale reader movable therealong, said scale reader being rigidly connected to said inner member and movable therewith to provide a direct linear measurement of said degree of strut extension.

4. The servostrut of claim 1 wherein both strut members are non-rotationally interfitted thick-walled tubes, said first universal joint is on the outer tube and comprises a ball receiving said outer tube concentrically therein, said ball being adapted for seating in a spherical socket, said second universal joint comprises a second ball mounted on an end of the inner tube and adapted for receipt in a spherical seat in a supported body, the linear actuator is a screw concentric with said tubes and engaged with a nut secured in said inner tube adjacent the inner end thereof, the screw is journaled in thrust bearings in said outer tube centered within said first-mentioned ball, the screw is driven reversibly by a servomotor mounted on said outer tube, and the linear position sensor comprises cooperating fixed and movable members mounted on said outer tube with the movable member fixedly connected to said inner tube at its outer end so as to move linearly with said inner tube and relative to said fixed sensor member to provide a direct linear measure of the degree of extension of said inner tube from the outer.

5. The servostrut of claim 4 having a second position sensor identical with that required by claim 4, and wherein the fixed members of both sensors comprise elongated digital scales fixed to the outer tube axially thereof on opposite sides of the central axis, the movable member of each sensor comprises a reader movable along its associated scale on a linear bearing way also secured to the outer tube, and a rod connected at its ends to said reader and to said inner tube at its outer end, respectively, moves the reader along its associated scale to sense and signal the degree of extension of the inner tube from the outer.

* * * * *